(12) United States Patent
Verdegan et al.

(10) Patent No.: US 6,601,385 B2
(45) Date of Patent: Aug. 5, 2003

(54) IMPACTOR FOR SELECTIVE CATALYTIC REDUCTION SYSTEM

(75) Inventors: Barry M. Verdegan, Stoughton, WI (US); Z. Gerald Liu, Madison, WI (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/981,157

(22) Filed: Oct. 17, 2001

(65) Prior Publication Data

US 2003/0070424 A1 Apr. 17, 2003

(51) Int. Cl.⁷ ................................................ F01N 3/00
(52) U.S. Cl. ............................ 60/286; 60/274; 60/301
(58) Field of Search ...................... 60/274, 286, 301; 423/235

(56) References Cited

U.S. PATENT DOCUMENTS

| | | |
|---|---|---|
| 3,380,810 A | 4/1968 | Hamblin |
| 3,645,093 A | 2/1972 | Thomas |
| 3,754,398 A | 8/1973 | Mattavi |
| 4,017,347 A | 4/1977 | Cleveland |
| 4,054,418 A | 10/1977 | Miller et al. |
| 4,538,413 A | 9/1985 | Shinzawa et al. |
| 4,651,524 A * | 3/1987 | Brighton ..................... 60/274 |
| 4,652,286 A | 3/1987 | Kusuda et al. |
| 4,730,454 A | 3/1988 | Pischinger et al. |
| 4,732,743 A | 3/1988 | Schmidt et al. |
| 4,854,123 A | 8/1989 | Inuoe |
| 4,866,932 A | 9/1989 | Morita et al. |
| 4,902,309 A | 2/1990 | Hempenstall |
| 5,021,227 A | 6/1991 | Kobayachi et al. |
| 5,053,062 A | 10/1991 | Barris et al. |
| 5,082,478 A | 1/1992 | Oono et al. |
| 5,171,341 A | 12/1992 | Merry |
| 5,209,062 A | 5/1993 | Vollenweider |
| 5,322,537 A | 6/1994 | Nakamura et al. |
| 5,339,630 A | 8/1994 | Pettit |
| 5,453,116 A | 9/1995 | Fischer et al. |
| 5,457,945 A | 10/1995 | Adiletta |
| 5,584,178 A | 12/1996 | Naegeli et al. |
| 5,611,832 A | 3/1997 | Suzuki et al. |
| 5,720,787 A | 2/1998 | Kasai et al. |
| 5,771,689 A | 6/1998 | Bareis et al. |
| 5,833,932 A * | 11/1998 | Schmelz ..................... 422/171 |
| 5,908,480 A | 6/1999 | Ban et al. |
| 5,992,141 A | 11/1999 | Berriman et al. |
| 6,003,305 A | 12/1999 | Martin et al. |
| 6,041,594 A | 3/2000 | Brenner et al. |
| 6,050,088 A | 4/2000 | Brenner |
| 6,361,754 B1 * | 3/2002 | Peter-Hoblyn et al. ...... 422/169 |
| 6,387,336 B2 * | 5/2002 | Marko et al. ............... 422/177 |
| 6,401,455 B1 * | 6/2002 | Mathes et al. .............. 423/235 |
| 6,401,499 B1 * | 6/2002 | Hofmann et al. ........... 423/212 |

FOREIGN PATENT DOCUMENTS

EP  0487886  * 6/1992

* cited by examiner

Primary Examiner—Thomas Denion
Assistant Examiner—Diem Tran
(74) Attorney, Agent, or Firm—Andrus, Sceales, Starke & Sawall, LLP

(57) ABSTRACT

A selective catalytic reduction system for engine exhaust injects a solution comprising a source of ammonia, preferably an aqueous urea solution, or other ammonia solution, to preferably evaporate, decompose and hydrolyze to produce ammonia to react with and reduce $NO_x$ in the exhaust. An inertial impactor in the housing between the injector and the catalyst is impacted by the solution droplets and holds same until evaporated, decomposed and hydrolyzed to ammonia.

11 Claims, 2 Drawing Sheets

IMPACTOR FOR SELECTIVE CATALYTIC REDUCTION SYSTEM

BACKGROUND AND SUMMARY

The invention relates to selective catalytic reduction systems for internal combustion engine exhaust, including for use in industrial processes and in mobile and stationary diesel, natural gas, and other engine applications.

Selective catalytic reduction (SCR) of nitrogen oxides (NOx) with urea or ammonia solution is known in industrial processes as well as in stationary diesel engine applications. In the SCR system, urea or ammonia solution is injected into the exhaust gas flow stream before the catalyst. Water in the droplets from the injection solution evaporates, leaving urea behind, which decomposes and hydrolyzes into ammonia, i.e. ammonia is produced through the process of droplet evaporation and urea chemical decomposition and hydrolysis. $NO_x$ reacts with the ammonia and is catalytically reduced in the presence of such ammonia.

Thus far, SCR catalysts have not been commercially used for mobile applications because of complexity. One of the many obstacles is that the limited space available in mobile applications makes it hard to evaporate droplets and decompose and hydrolyze the urea completely and achieve a high enough ammonia to $NO_x$ ratio. At low diesel engine exhaust temperatures and high gas flow velocities (e.g. about 20 meters per second), a distance of several meters (i.e. a time of 0.1 to 0.3 seconds) between the injector and the catalyst is required for the aqueous urea solution spray to vaporize, for urea to decompose and hydrolyze into ammonia and carbon dioxide, and for the ammonia to become uniformly distributed across the flow front before entering the catalyst. In order to be practical, this distance must be shortened to less than about 0.5 meters. The droplet evaporation and urea decomposition and hydrolysis are key factors affecting performance of the SCR system.

The present invention provides a selective catalytic reduction system which may be used in mobile applications. The noted distance between the injector and the catalyst is shortened by retaining the solution on an impactor while evaporation, and decomposition in the case of urea, occur. The solution evaporation rate, and decomposition rate in the case of urea, is further enhanced through heating. The invention also includes an embodiment that enhances the hydrolysis process.

DETAILED DESCRIPTION

Figure 1:
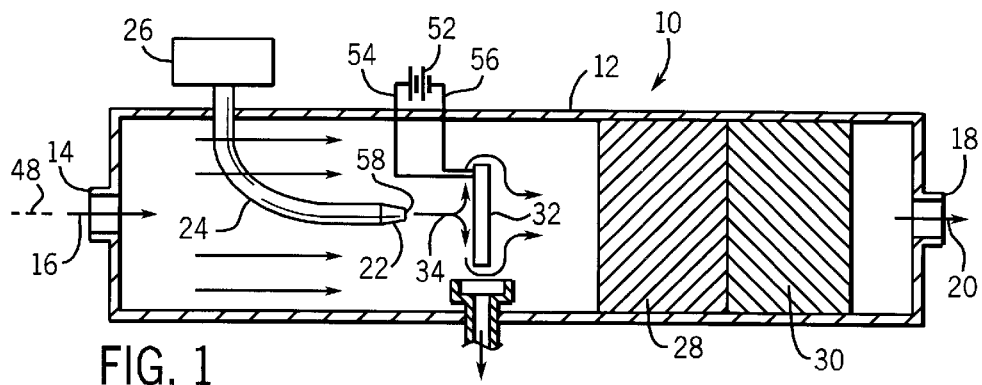
FIG. 1 is a side schematic sectional view of a selective catalytic reduction, SCR, device in accordance with the invention.

FIG. 1 shows a selective catalytic reduction device 10 for internal combustion engine exhaust. The device includes a housing 12 having an upstream inlet 14 for receiving exhaust as shown at arrow 16, and a downstream outlet 18 for discharging the exhaust as shown at arrow 20. An injector 22 in the housing injects aqueous urea solution through tubular conduit 24 from reservoir or tank 26. As known, the droplets in the solution evaporate, and the urea decomposes and hydrolyzes to produce ammonia to react with and reduce NOx in the exhaust by catalytic reduction in the presence of such ammonia. A catalyst is provided in the housing downstream of injector 22, including SCR catalyst 28 and oxidation catalyst 30.

In one embodiment, a nonporous inertial impactor 32 is provided in the housing between injector 22 and catalyst 28 and is impacted by exhaust and urea flow as shown at 34. In preferred form, nonporous impactor 32 holds the solution until the droplets have evaporated and the urea has decomposed and hydrolyzed to ammonia. This is accomplished by selecting the impactor and the injection rate from the injector to satisfy the condition that the evaporation and decomposition rate at the impactor is greater than the injection rate at the injector. This is accomplished in the present invention in a number of ways, to be described.

Figure 2:
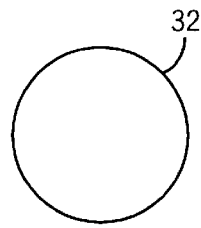
FIG. 2 is an end elevation view of a component of FIG. 1.
Figure 3:
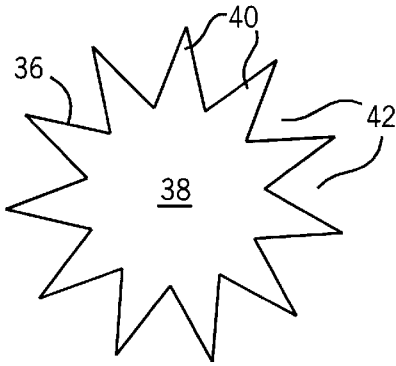
FIG. 3 is like FIG. 2 and shows another embodiment.
Figure 5:
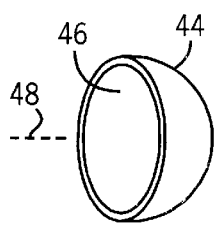
FIG. 5 is a perspective view of another alternate component of FIG. 1.
Figure 6:
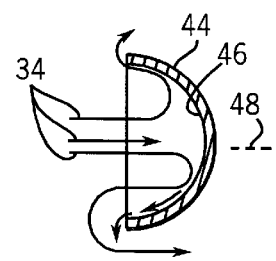
FIG. 6 is a side sectional view of the component of FIG. 5.

In one embodiment, the noted condition is satisfied by sizing impactor 32 to a large enough size, for example a circular impactor, FIG. 2, having a large enough diameter. In embodiments where flier increase in size may be objectionable because of blockage or restriction of exhaust flow, the impactor has a star shape, as shown at impactor 36, FIG. 3, with a central core 38 and a plurality of radially outwardly projecting tips 40 each providing impaction surface area yet permitting exhaust flow therebetween at spaces 42. In another embodiment, where increased lateral size is objectionable, the impactor has a bowl shape, as shown at 44, FIGS. 5, 6, with a concave surface 46 facing injector 22. Concave surface 46 provides increased impaction surface area within a reduced lateral area blocking exhaust flow.

Figure 4:
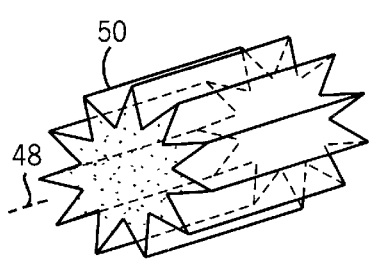
FIG. 4 is a perspective view of an alternate component of FIG. 1.

In a flier embodiment, the impactor is a porous member holding the injected solution until it evaporates and decomposes. The axial length of the impactor along axis 48 may be varied to control the holding capacity of the porous impactor, for example as shown at impactor 50 in FIG. 4. In one desirable embodiment, the impactor has a rough porous collection surface, for example as disclosed in U.S. Pat. No. 6,290,738, incorporated herein by reference, causing liquid particle separation of smaller size liquid particles than a smooth nonporous impactor impingement surface, to improve evaporation and decomposition.

A porous impactor has several advantages over a nonporous impactor. In the case of a porous impactor, it is not necessary that the urea solution evaporation and decomposition rate at the impactor be greater than the urea solution injection rate at the injector, because the impactor can be sized such that it can hold excess urea solution when the injection rate exceeds the evaporation/decomposition rate, buffering against such imbalances. In the case of a porous impactor, it may be desirable to make the impactor surface preferentially wetted by the urea solution, so that the solution will be drawn into the impactor and spread over a greater surface area, facilitating evaporation, decomposition and hydrolysis. It may be desirable to provide a high thermal conductivity impactor of low heat capacity and/or low thermal mass, because it is easier to heat, ideally by the exhaust, but also optionally by a heat source, for example as provided by a voltage source 52 external of the housing, and a pair of electrical conductor 54, 56 connecting the voltage source to the impactor. The impactor can be coated with or actually be a hydrolysis catalyst, to facilitate decomposition.

The urea solution droplets sprayed out of urea injector 22 are impacted onto impactor 32. The impactor is placed such that the momentum of the droplets causes them to deviate from the flow stream and impact on the impactor surface. Deposited droplets are held on or within the impactor until they evaporate. For a nonporous impactor or for a porous impactor that is undersized for the injection-evaporation/decomposition imbalance, the urea solution injection rate is less than or equal to the evaporation and decomposition rate, otherwise the impactor will release larger, coalesced drops or else solid urea particles may accumulate on the impactor. The impactor is desirably heated in order to accelerate vaporization and decomposition. Depending on the urea solution injection rate and exhaust gas temperatures, heating may be done electrically or by the exhaust. The impactor should desirably have a high thermal conductivity to facilitate transfer of heat to the urea solution. If a porous impactor is used, it should be preferentially wetted by the urea solution, in order for the urea to be drawn into and held by the impactor. An advantage of heating the impactor instead of the injector is that heat transfer to the urea solution is more effective. Temporary accumulation of dry urea on the impactor, until it heats up upon engine restart, does not adversely affect performance. The axial distance along axis 48 between downstream injection tip 58 of injector 22 and catalyst 28 is less than about 0.5 meters.

In the preferred embodiment, an aqueous urea solution is injected, as described, which evaporates, decomposes and hydrolyzes to produce ammonia to react with and reduce $NO_x$ in the exhaust. In further embodiments, other ammonia solutions or sources of ammonia may be used.

Figure 7:
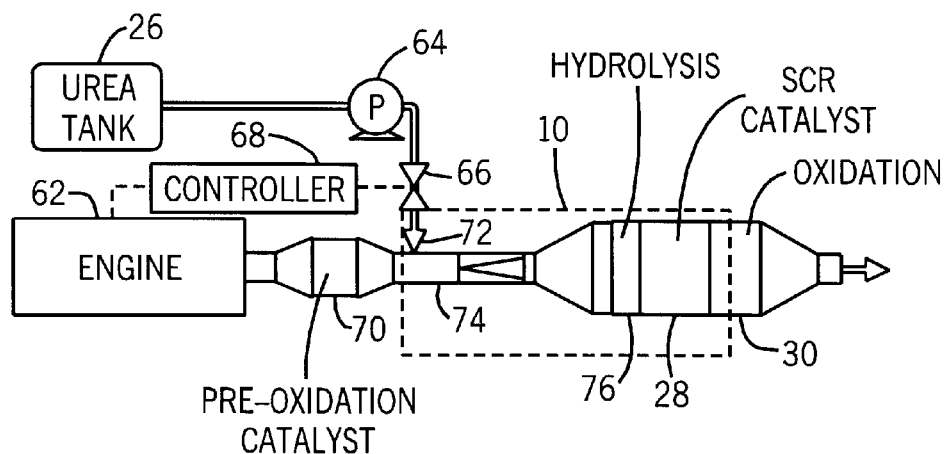
FIG. 7 is a schematic illustration of an SCR, selective catalytic reduction, system.
Figure 8:
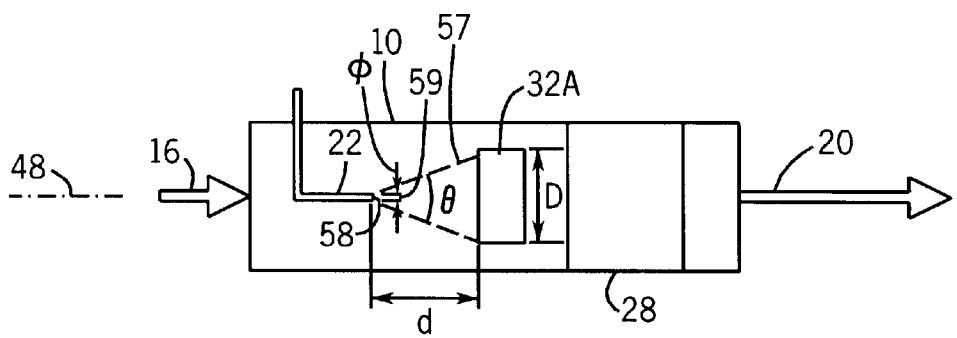
FIG. 8 is similar to FIG. 1 and further illustrates an embodiment in accordance with the invention.
Figure 9:
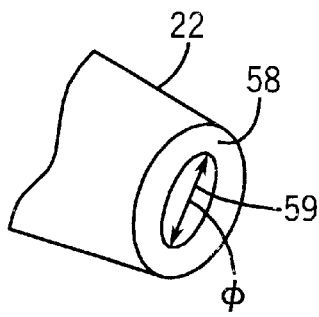
FIG. 9 is an isometric enlarged view of a portion of FIG. 8.

FIG. 7 shows an SCR system for exhaust from engine 62. Pump 64 draws aqueous urea solution from tank 26 and supplies same through valve 66 which is controlled by controller 68 which in turn is controlled by the engine, all as is known. Engine exhaust is initially supplied through pre-oxidation catalyst 70 and then mixed with the aqueous urea solution injected at 72 into exhaust pipe 74. The mixture then flows downstream to hydrolysis catalyst 76, SCR catalyst 28 and oxidation catalyst 30. In accordance with one embodiment of the present invention, the hydrolysis catalyst is removed from its location as shown at 76 and instead provided at impactor 32, FIG. 1, as shown at hydrolysis catalyst impactor 32a in FIG. 8. The impactor including the hydrolysis catalyst is spaced downstream from injector 22 and spaced upstream from SCR catalyst 28, facilitating decomposition and hydrolysis of the aqueous urea solution at the impactor and upstream of the SCR catalyst. Housing 10 has a given cross-sectional area at SCR catalyst 28 transverse to axis 48. Hydrolysis catalyst 32a has a lateral cross-sectional area transverse to axis 48 which is less than the noted given cross-sectional area. Aqueous urea solution is injected along an injection spray angle θ at 57 from injector 22. Hydrolysis catalyst 32a has a lateral cross-sectional dimension D transverse to axis 48. Injector 22 has the noted downstream injection tip 58 spaced from hydrolysis catalyst 32a by a distance d along axis 48. Injection tip 58 has an inner diameter φ at 59 transverse to axis 48. In the preferred embodiment D>2d tan(θ/2)+φ. Hydrolysis catalyst 32a is spaced in the spray path of the aqueous urea solution, with D being larger than the diameter of the spray pattern. The described arrangement provides significant benefits over an SCR system with the conventional hydrolysis catalyst placement shown in FIG. 7. These benefits include: (1) the distance between injector 22 and SCR catalyst 28 can be shortened; (2) the size, particularly the lateral cross-sectional dimension, of the hydrolysis catalyst can be significantly reduced; (3) pressure drop is reduced because the hydrolysis catalyst no longer occupies the entire cross-sectional area of the housing as in FIG. 7; and (4) there is increased time for ammonia mixing prior to SCR catalyst 28. Hydrolysis catalyst 32a preferably has a dominant impactor effect to catch droplets of the aqueous urea solution, but in other embodiments can be a flow-through catalyst wherein some droplets would be caught by impaction, but most would be captured an the walls as they flow through the channels. The hydrolysis catalyst is preferably selected from the group consisting of: extruded material; wrapped material, such as pleated or corrugated; and layered material. The catalyst is further preferably selected from the group consisting of extruded monolith material; composite ceramic material, for example as in commonly owned U.S. patent applications Ser. No. 09/573,747, filed May 18, 2000, and Ser. No. 09/935,847, filed Aug. 23, 2001; fibrous material; and metallic material, such as flow-through metal foils and the like. As in previous embodiments, the hydrolysis catalyst can be heated, e.g. by heat source 52, in addition to heating by the exhaust, to accelerate evaporation and decomposition and enhance hydrolysis.

It is recognized that various equivalents, alternatives and modifications are possible within the scope of the appended claims which distinctly claim the subject matter regarded as the invention.

What is claimed is:

1. A selective catalytic reduction device for engine exhaust comprising:

a housing having an upstream inlet for receiving said exhaust, and a downstream outlet for discharging said exhaust;

an injector in said housing for injecting a solution comprising a source of ammonia to react with and reduce $NO_x$ in said exhaust;

a catalyst in said housing downstream of said injector;

an inertial impactor in said housing between said injector and said catalyst and impacted by said exhaust and said solution, wherein said impactor holds said solution to enhance ammonia reaction with $NO_x$, said impactor is nonporous, and wherein said impactor and the injection rate from said injector are selected to satisfy the following condition: the solution evaporation rate at said impactor is greater than the injection rate at said injector.

2. The selective catalytic reduction device according to claim 1 wherein said condition is satisfied by sizing said impactor to a large enough size.

3. The selective catalytic reduction device according to claim 1 wherein said source of ammonia is an aqueous urea solution which evaporates, decomposes and hydrolyzes to produce ammonia to react with and reduce $NO_x$ in said exhaust, and wherein said impactor and the injection rate from said injector are selected to satisfy the following condition: the aqueous urea solution evaporation and decomposition rate at said impactor is greater than the injection rate at said injector, such that said impactor holds said aqueous urea solution until evaporated and decomposed to ammonia.

4. A selective catalytic reduction device for engine exhaust comprising:
- a housing having an upstream inlet for receiving said exhaust, and a downstream outlet for discharging said exhaust;
- an injector in said housing for injecting a solution comprising a source of ammonia to react with and reduce $NO_x$ in said exhaust;
- a catalyst in said housing downstream of said injector;
- an inertial impactor in said housing between said injector and said catalyst and impacted by said exhaust and said solution, wherein said impactor holds said solution to enhance ammonia reaction with $NO_x$, and said impactor has a star shape with a central core and a plurality of radially outwardly projecting tips each providing impaction surface area yet permitting exhaust flow therebetween.

5. A method for enhancing ammonia reaction with $NO_x$ in a selective catalytic reduction device for engine exhaust having a housing with an upstream inlet for receiving said exhaust, and a downstream outlet for discharging said exhaust, comprising injecting a solution comprising a source of ammonia in said housing with an injector to react with and reduce $NO_x$ in said exhaust, providing a catalyst in said housing downstream of said injector, inertially impacting said exhaust and said solution against an inertial impactor in said housing between said injector and said catalyst, and comprising holding said solution at said impactor to enhance ammonia reaction with $NO_x$, and providing a nonporous said impactor, and injecting said solution from said injector at an injection rate less than the solution evaporation rate at said impactor.

6. The method according to claim 5 comprising providing said impactor with a large enough size such that said evaporation rate at said impactor is greater than said injection rate at said injector.

7. The method according to claim 5 comprising providing said source of ammonia as an aqueous urea solution which evaporates, decomposes and hydrolyzes to produce ammonia to react with and reduce $NO_x$ in said exhaust, and injecting said aqueous urea solution from said injector at an injection rate less than the aqueous urea solution evaporation and decomposition rate at said impactor, such that said impactor holds said aqueous urea solution until evaporated and decomposed to ammonia.

8. A selective catalytic reduction device for engine exhaust comprising:
- a housing having an upstream inlet for receiving said exhaust, and a downstream outlet for discharging said exhaust;
- an injector in said housing for injecting an aqueous urea solution which evaporates, decomposes and hydrolyzes to produce ammonia to react with and reduce $NO_x$ in said exhaust;
- an SCR catalyst in said housing downstream of said injector;
- an impactor in said housing and spaced downstream from said injector and spaced upstream from said SCR catalyst, said impactor comprising a hydrolysis catalyst facilitating decomposition and hydrolysis of said aqueous urea solution at said impactor, wherein said housing extends axially along an axis and exhaust flows generally axially through said housing, said aqueous urea solution is injected along an injection spray angle $\theta$ from said injector, said hydrolysis catalyst has a lateral cross-sectional dimension D transverse to said axis, said injector has a downstream injection tip spaced from said hydrolysis catalyst by a distance d along said axis and having an inner diameter $\phi$ transverse to said axis, and wherein $D > 2d \tan(\theta/2) + \phi$.

9. The selective catalytic reduction device according to claim 8 wherein said hydrolysis catalyst is selected from the group consisting of porous and fibrous ceramic material.

10. The selective catalytic reduction device according to claim 8 wherein said hydrolysis catalyst is selected from the group consisting of: extruded material; wrapped material; and layered material.

11. The selective catalytic reduction device according to claim 8 wherein said hydrolysis catalyst is selected from the group consisting of: extruded monolith material; composite ceramic material; fibrous material; and metallic material.

* * * * *